(12) United States Patent
Tregenza Dancer

(10) Patent No.: US 9,210,105 B2
(45) Date of Patent: Dec. 8, 2015

(54) TELECOMMUNICATIONS EQUIPMENT

(71) Applicant: Metaswitch Networks Ltd, Enfield (GB)

(72) Inventor: Colin Tregenza Dancer, Enfield (GB)

(73) Assignee: METASWITCH NETWORKS LTD, Enfield (GB)

( * ) Notice: Subject to any disclaimer, the term of this patent is extended or adjusted under 35 U.S.C. 154(b) by 21 days.

(21) Appl. No.: 13/871,156

(22) Filed: Apr. 26, 2013

(65) Prior Publication Data

US 2013/0286815 A1 Oct. 31, 2013

(30) Foreign Application Priority Data

Apr. 27, 2012 (GB) .................................. 1207414.2

(51) Int. Cl.
  *H04L 12/703* (2013.01)
  *H04L 12/707* (2013.01)
  *H04L 12/701* (2013.01)
  *H04L 12/939* (2013.01)
  *H04Q 1/10* (2006.01)

(52) U.S. Cl.
  CPC ................ *H04L 49/552* (2013.01); *H04Q 1/10* (2013.01)

(58) Field of Classification Search
  CPC .......... H04L 45/28; H04L 45/22; H04L 45/00
  USPC .................. 370/217–219, 221, 225
  See application file for complete search history.

(56) References Cited

U.S. PATENT DOCUMENTS

| 4,513,370 | A | * | 4/1985 | Ziv et al. ....................... 709/225 |
| 5,315,252 | A | | 5/1994 | Puetz et al. |
| 5,663,949 | A | * | 9/1997 | Ishibashi et al. .............. 370/220 |
| 6,879,559 | B1 | | 4/2005 | Blackmon et al. |
| 7,058,011 | B1 | | 6/2006 | Stearns et al. |
| 7,382,724 | B1 | * | 6/2008 | Woo .............................. 370/230 |
| 7,952,992 | B1 | | 5/2011 | Ghorishi et al. |
| 2002/0093966 | A1 | | 7/2002 | Liva et al. |
| 2002/0173278 | A1 | | 11/2002 | Fritz et al. |
| 2002/0179720 | A1 | | 12/2002 | Liva et al. |
| 2006/0163945 | A1 | | 7/2006 | Bornhorst et al. |
| 2007/0290713 | A1 | | 12/2007 | Ding et al. |
| 2012/0002377 | A1 | | 1/2012 | French et al. |

OTHER PUBLICATIONS

Valiant Communications: "DS3 Failover (DS3 Protection) Switch", http://www.valiantcom.com/aps/ds3-failover-switch.html.
Valiant Communications Limited: "DS3 Fail-Over (DS3 Protection) Switch Product Brochure & Data Sheet", Copyright: Valiant Communications Limited—Oct. 2007.
ARG: "Protection switching of Telco circuits", 2010 A.R.G. ElectroDesign Ltd, United Kingdom.
EP Search Report issued in corresponding EP Application No. 13165003.8 dated Jul. 18, 2013.

* cited by examiner

*Primary Examiner* — Ronald B Abelson
(74) *Attorney, Agent, or Firm* — EIP US LLP

(57) ABSTRACT

Telecommunications equipment includes first and second signal processing modules each including one or more line interface units, the first and second signal processing modules being arranged to be activated dependent on a failover state of the first and second signal processing modules. The telecommunications equipment further includes a plurality of external connectors and a plurality of isolation transformers arranged in one or more signal paths connected to the external connectors. Additionally, a first equipment housing includes at least the first and second signal processing modules and at least one further equipment housing includes at least the external connectors and isolation transformers.

15 Claims, 5 Drawing Sheets

TELECOMMUNICATIONS EQUIPMENT

CROSS REFERENCE TO RELATED APPLICATION

This application claims the benefit under 35 U.S.C. §119 (a) and 37 CFR §1.55 to UK patent application no, 1207414.2, filed on Apr. 27, 2012, the entire content of which is incorporated herein by reference.

TECHNICAL FIELD

The present invention relates to telecommunications equipment, in particular but not exclusively to telecommunications equipment comprising first and second signal processing modules each comprising one or more line interface units, the first and second signal processing modules being arranged to be activated dependent on a failover state of the first and second signal processing modules.

BACKGROUND

There is a general desire to increase the number of communication channels supported by telecommunications equipment, for example telephony switches, to support the growing needs of the telecommunications industry and its users alike.

A Line Interface Unit (LIU) is used in telecommunications equipment to transmit information over communication lines and to retrieve information that is transmitted over communications lines. The transmit side of an LIU converts a digital signal into the correct analogue waveform for transmission. The receive side of an LIU adapts to the amplitude of incoming signals and recovers first the associated clock then the transmitted data. Different LIUs support different numbers of channels; some support just a single channel and others support sixteen or more channels. An isolation transformer is provided for each channel so that the LIU is galvanically isolated from the incoming signal lines. There are also protection components which protect the LIU against surges and other high voltage events on signal lines.

Some systems provide two (or more) mounting boards in the equipment chassis, each with LIUs and isolation transformers in a failover arrangement, whereby the system can fail from one mounting board to the other. Such systems are limited in terms of the channel density that they can achieve. This is because the addition of required components would necessitate increasing the size of the chassis in which they are provided or modifying the chassis in some other way, which may not be desirable.

It would be therefore be desirable to provide telecommunications equipment with the potential for increased communication channel density whilst ameliorating the need to modify or increase the size of a housing.

SUMMARY

According to a first aspect of the invention, there is provided telecommunications equipment comprising:

first and second signal processing modules each comprising one or more line interface units, the first and second signal processing modules being arranged to be activated dependent on a failover state of the first and second signal processing modules;

a plurality of external connectors;

a plurality of isolation transformers arranged in one or more signal paths connected to the external connectors, wherein a first equipment housing comprises at least the first and second signal processing modules and at least one further equipment housing comprises at least the external connectors and isolation transformers.

According to a second aspect of the invention there is provided a telecommunications equipment module comprising a plurality of external connectors; and a plurality of isolation transformers, each corresponding to an external connector, wherein the telecommunications equipment module is adapted to be connectable to first and second signal processing modules each comprising one or more line interface units, the first and second signal processing modules being arranged to be activated dependent on a failover state of the first and second signal processing modules.

According to a third aspect of the invention, there is provided telecommunications equipment comprising:

a first equipment housing comprising at east one signal processing module; and at least one further equipment housing that is communicatively couplable to the first equipment housing, the at least one further equipment housing comprising:

at least one external connector; and at least one isolation transformer in one or more signal paths between the at least one external connector and the at least one signal processing module in the first equipment housing, wherein the at least one further equipment housing is external to the first housing.

Further features and advantages of the invention will become apparent from following description of preferred embodiments of the invention, given by way of example only, which is made with reference to the accompanying drawings.

DETAILED DESCRIPTION

Figure 1:
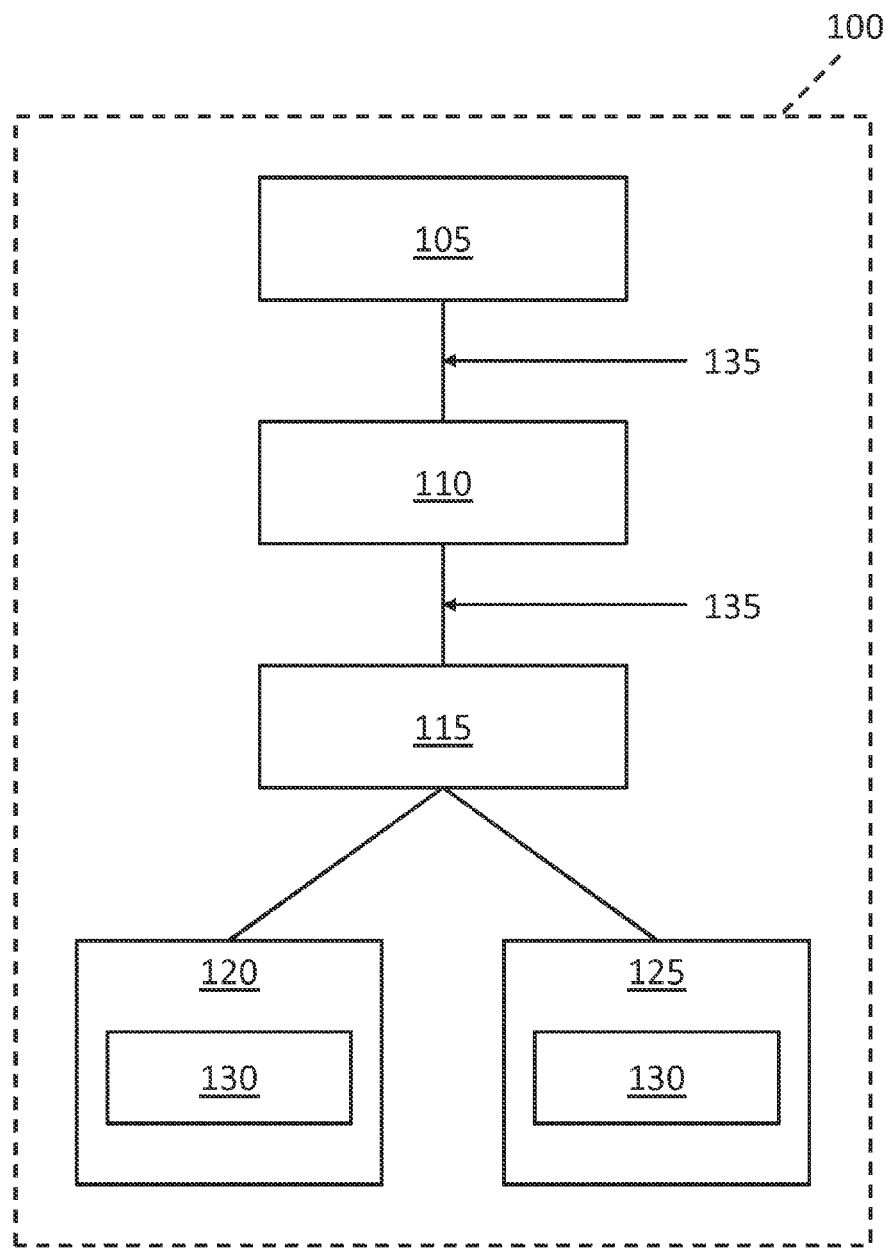
FIG. 1 is a schematic representation of telecommunications equipment in accordance with some embodiments.

FIG. 1 is a schematic representation of telecommunications equipment 100 in accordance with some embodiments.

In some embodiments, the telecommunications equipment 100 comprises a telephony switch. In some embodiments, the telecommunications equipment 100 comprises a media gateway, for example a Next Generation Media Gateway (NGMG).

The telecommunications equipment 100 comprises a plurality of external connectors 105. In some embodiments, the connectors 105 are industry-standard connectors. The telecommunications equipment 100 comprises a plurality of isolation transformers 110. An isolation transformer may be used to provide galvanic isolation from incoming signal lines. Each of the isolation transformers 110 corresponds to a channel on the external connector 105. In some embodiments, the telecommunications equipment 100 comprises failover signal distributors 115. The failover signal distributors 115 are operable to communicate signals to and/or from a first signal processing module 120 and a second signal processing module 125. The first and second signal processing modules 120, 125 each comprise one or more LIUs 130. In some embodiments, isolation transformers 110 are in one or more signal paths 135 between the external connectors 105 and the failover signal distributors 115.

In some embodiments, the telecommunications equipment 100 comprises the first and second signal processing modules 120, 125 as depicted in FIG. 1. In some embodiments, however, the telecommunications equipment 100 may not comprise the first and second signal processing modules 120, 125.

In some embodiments, the telecommunications equipment 100 supports a number of copper-based Time-division Multiplexing (TDM) carriers, for example T-carrier level 1 (T1), E-carrier level 1 (E1), Digital Signal 3 (DS3) etc. The wiring used (twisted pair, coaxial, etc) differs according to the carrier type, but has separate transmit and receive signals. These signals terminate at the plurality of external connectors 105, and are routed through the plurality of isolation transformers 110 to the LIUs 130 via the failover signal distributors 115. The transmit side of each LIU 130 converts a digital signal into the correct analogue waveform for transmission. The receive side of each LIU 130 adapts to the amplitude of incoming signals and recovers first the associated clock then the data.

In some embodiments, the telecommunications equipment 100 supports Equipment Protection Switching (EPS) in which one or more backup or second LIUs and possibly other backup or second processing resources are provided in the telecommunications equipment 100. In the event of failure of a first resource, channels that were being processed by the failed resource are instead processed by the backup resources.

In some embodiments, the failover signal distributors 115 provide EPS by distributing, for example, splitting or switching, signals between the first and second signal processing modules 120, 125. Furthermore, each of the modules 120, 125 comprises a failover controller which operates to selectively activate one or other of the modules 120, 125 dependent on a failover state of the equipment 100. Thus, the first and second signal processing modules 120, 125 are arranged to be activated dependent on a failover state of the telecommunications equipment 100. If for example the first module 120 becomes inoperative or is not functioning correctly, the second module 125 may be activated. The failover signal distributors 115 may either split and include each of the modules in the signal paths at all times, or may switch between the modules dependent on the failover state of the equipment 100, under the control of one or each of the failover controllers in the signal processing modules.

EPS may be achieved with the aid of ultra-high reliability switches/splitters, placed between LIUs and connectors, with the signals being switched to backup resources either using discrete internal wiring within a chassis or dedicated midplane/backplane wiring. However, none of the major, standard midplane architectures (for example VME, CPCI etc) defined solutions for use with EPS. ATCA added so-called "update channels", which support dedicated signals between logically adjacent pairs of blades. However, even this does not meet general EPS requirements because the number of signals is highly limited because and the connection to the update channel is from a front mounting board only (where a front and rear mounting board are used). This means that any signal coming into the Rear Transition Module (RTM) gets isolated if the front mounting board is removed. One way to resolve this would be to alter the standard midplane, repurposing the J2 connector from 64-bit PCI to dedicated EPS wiring accessible from the RTMs. For example, a bus architecture providing a single (5:1)×(16 T1/E1) EPS group or different wiring to offer two (6:1)×(3 DS3) EPS groups might be used. However, this comes at the expense of a custom midplane, limited capacity (due to limited pins to repurpose) and tying each midplane to a particular type of traffic (in the first case to DS1 signals and in the second case to DS3 signals).

Some embodiments described herein provide telecommunications equipment 100 for providing EPS. In some such embodiments, processing elements such as LIUs 130 may be in a standards-based system (for example an Advanced Telecommunications Computing Architecture (ATCA) or Compact Peripheral Component Interconnect (CPCI) standard-based system) which does not provide EPS in the standard. Some such embodiments do not require dedicated EPS wiring in the midplane/backplane of an enclosure containing the LIUs 130, for example if the failover signal distributors 115 provides BPS and the LIUs 130 and failover signal distributors 115 are provided in different equipment housings.

Figure 2:
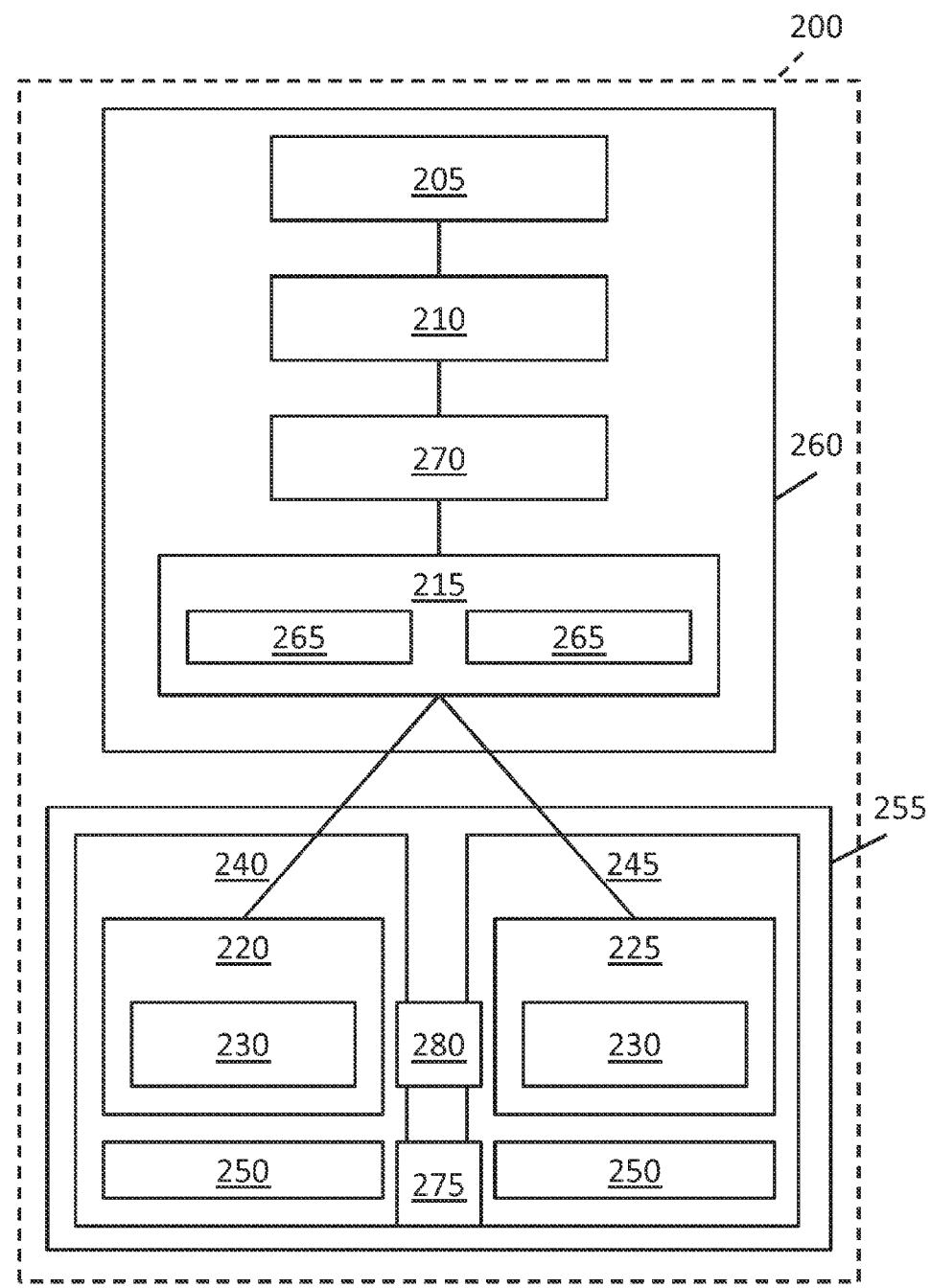
FIG. 2 is a schematic representation of telecommunications equipment in accordance with some embodiments.

FIG. 2 is a schematic representation of telecommunications equipment 200 in accordance with some embodiments. The telecommunications equipment 200 comprises some features that are the same as, or are similar to, corresponding features described above in relation to FIG. 1. The same reference numerals are used for such features but are incremented by 100.

In some embodiments, the first signal processing module 220 is provided on a first mounting board 240. In some embodiments, the second signal processing module 225 is provided on a second mounting board 245. In some embodiments, the first and second mounting boards 240, 245 comprise Rear Transition Module (RTM) cards.

In some embodiments, the first and/or second mounting board 240, 245 comprises at least one failover controller 250 for controlling the failover signal distributors 215.

In some embodiments, the telecommunications equipment 200 comprises a first equipment housing 255. In some embodiments, the first equipment housing 255 comprises at least the first and second signal processing modules 220, 225. The first equipment housing 255 may comprise additional components. In some embodiments, the first equipment housing 255 is a chassis that is in accordance with one or more standard chassis specifications.

In some embodiments, the telecommunications equipment 200 comprises at least one further equipment housing 260. In some embodiments, the at least one further equipment housing 260 is a breakout unit, sometimes referred to as a 'breakout panel' or 'breakout box', connected to the first equipment housing 255 via flexible cables.

In some embodiments, the at least one further equipment housing 260 is external to the first equipment housing 255. In some embodiments, the at least one further equipment housing 260 is internal to the first equipment housing 255. In some such embodiments, the at least one further equipment housing 260 may be separate from either of the mounting boards 240, 245.

In some embodiments, the at least one further equipment housing 260 comprises at least the external connectors 205 and isolation transformers 210. The at least one further equipment housing 260 may comprise additional components.

In some embodiments, the at least one further equipment housing 260 comprises the failover signal distributors 215. In some embodiments, the first equipment housing 255 comprises all or part of the failover signal distributors 215.

In some embodiments, the failover signal distributors 215 comprise a plurality of signal distributors 265, each corresponding to an external connector 205. In some embodiments, the failover signal distributors 215 comprise a plurality of relays. In some embodiments, the failover signal distributors 215 comprise a plurality of signal splitters.

In some embodiments, the at least one further equipment housing 260 comprises protection components, such as a plurality of clamp diodes 270, each corresponding to an external connector 205. The protection components may be provided in the at least one further equipment housing 255 for maximum space saving in the first equipment housing 260. Alternatively, the protection components may be provided in the first equipment housing 255 on the first and second mounting boards 240, 245.

In some embodiments, the first and backup mounting boards 240, 245 are connected to each other via a backplane 275. In some embodiments, the backplane 275 is in accordance with one or more standard backplane specifications.

In some embodiments, the first and backup mounting boards 240, 245 are connected to each other via a midplane 280. In some embodiments, the midplane 280 is in accordance with one or more standard midplane specifications.

In some embodiments, instead of having protection components, such as the clamp diodes 270, and the isolation components, such as the isolation transformers 210, next to the LIUs 230 on the mounting boards 240, 245 in the first equipment housing 255, both the clamp diodes 270 and the isolation transformers 210 are provided in one or more different equipment housings to that of the LIUs 230. In some embodiments, the LIUs 230 are provided on first and second mounting boards 240, 245 and neither the clamp diodes 270 nor the isolation transformers 210 is provided on either of the first and second mounting boards 240, 245.

In some embodiments, the failover signal distributors 215 provide EPS. The failover signal distributors 215 may employ a 'Y circuit' for DS1 carriers. For higher frequency DS3 carriers, the failover signal distributors 215 may employ a combination of one or more inductive splitters and relay driven termination resistors for receive (in case one of the mounting boards 240, 245 is removed from the chassis), and a relay to select between signals for transmit.

In some embodiments, the at least one further equipment housing 260 may comprise a module which may be fitted into an unused part of the chassis 255. In such embodiments, appropriate cables may be used from the module to the mounting boards 240, 245. Although this may increase cabling, it may result in increased channel density even though the isolation transformers 210 are still located within the chassis 255.

In some embodiments, unprotected LIU-level signals (plus control signals) are run over long (1 meter or above) high-density cables from the mounting boards 240, 245 to the failover signal distributors 215.

In some embodiments, the isolation transformers 210 and clamp diodes 270 are located within a different enclosure to an enclosure in which the LIUs 230 are located.

In some embodiments, the protection elements, such as the clamp diodes 270, and the isolation components, such as the isolation transformers 210, may be provided in a breakout panel 255 or the like to allow the high channel densities to be achieved. The breakout panel or the like may provide greater space compared to a standards-based chassis, which allows the use of industry-standard connectors. Both carrier and control signals may be provided over umbilical cables that connect the chassis to the breakout panel so that no direct power is required to the breakout panel. The control signals may allow coordination of failover between processing elements, such as the LIUs 230, without requiring dedicated inter-processing element wiring in the chassis. The breakout panel may be provided with indicator lights to display both health of the associated processing systems and also which are currently active. The breakout panel may include cable trace switches to allow confirmation of the correct wiring of the breakout cables. The breakout panel may comprise identification components to allowing processing elements, such as the LIUs 230, both to detect the presence of the breakout panel and to determine whether or not it is of the correct type.

In some embodiments, the telecommunications equipment 200 comprises a media gateway such as a Next Generation Media Gateway (NGMG). In some embodiments, the telecommunications equipment 200 works in an ATCA environment. In some embodiments, the telecommunications equipment 200 has a standard or standards-based chassis. In some embodiments, the telecommunications equipment 200 provides mix-and-match carrier support. In some embodiments, the telecommunications equipment 200 uses industry-standard connectors.

In some embodiments, components, such as the external connectors, protection and isolation components and relays/splitters, that would conventionally be provided in the chassis (for example on the mounting boards themselves) are, instead, provided in a separate, external, breakout panel or the like. In some embodiments, carriers connect to the breakout panel, which being external to the chassis, has the space to use industry standard connectors.

In some embodiments, the components in the breakout panel provide protection, isolation and also splitting and or switching of signals. In some embodiments, the breakout panel connects to the mounting boards 240, 245, for example the ATCA RTMs of both first and second mounting boards, using relatively short (for example less than 10-meter) umbilical cables or connectors. Some embodiments may provide n:1 protection where protection is provided for more than two mounting boards. In some embodiments, each mounting board 240, 245 (or, for example, each RTM associated with each mounting board) provides matching high density connectors, which connect both to the LIUs 230 and also to the failover controller 230 for controlling the failover signal distributors 215. In some embodiments, the failover controller 230 may drive the relays in the failover signal distributors 215.

Figure 3:
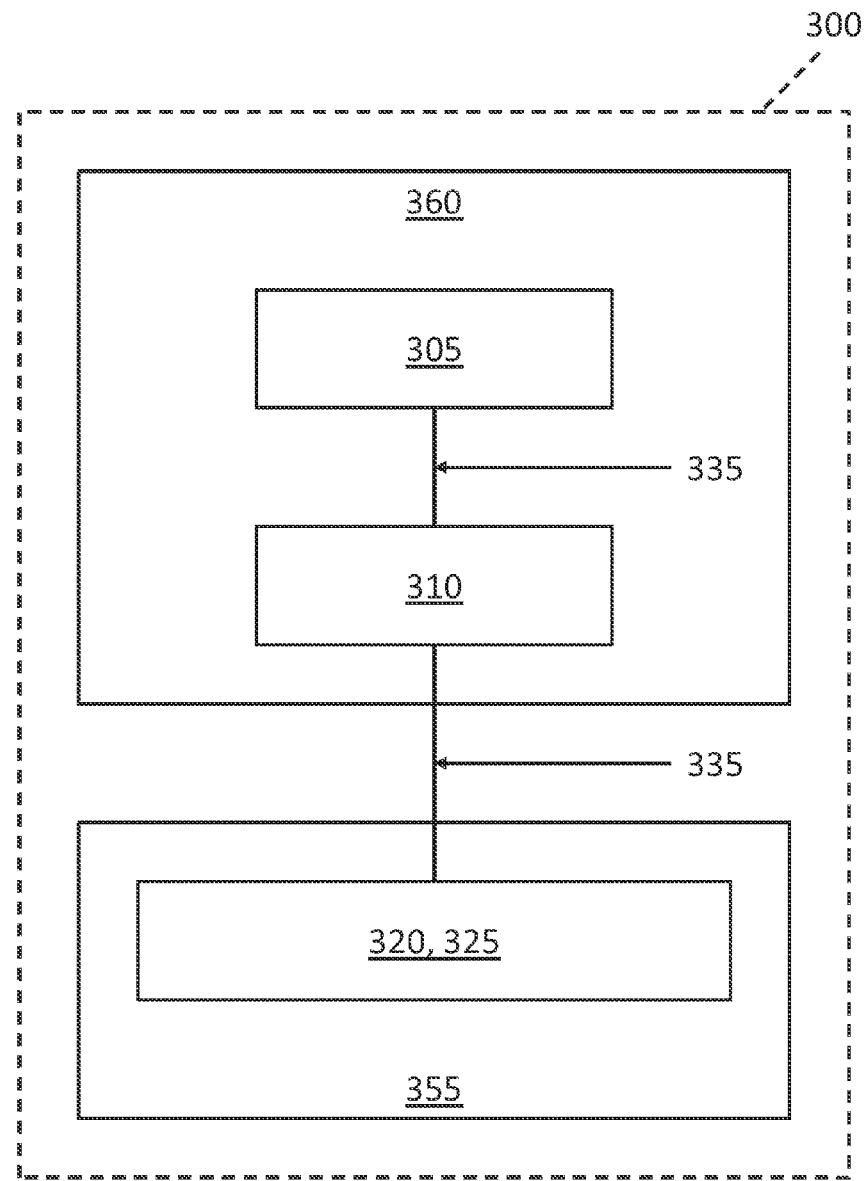
FIG. 3 is a schematic representation of telecommunications equipment in accordance with some embodiments.

FIG. 3 is a schematic representation of telecommunications equipment 300 in accordance with some embodiments. The telecommunications equipment 300 comprises some features that are the same as, or are similar to, corresponding features described above in relation to FIGS. 1 and/or 2. The same reference numerals are used for such features but are incremented by 200 or 100 respectively.

The telecommunications equipment 300 comprises a first equipment housing 355. The first equipment housing 355 comprises at least one signal processing module 320, 325. The telecommunications equipment comprises at least one further housing 360 that is communicatively couplable to the first equipment housing 355. The at least one further equipment housing 360 comprises at least one external connector 305. The at least one further equipment housing 360 comprises at least one isolation transformer 310 in one or more signal paths 335 between the at least one external connector 305 and the at least one signal processing module 320, 325 in the first equipment housing 355. The at least one further equipment housing 360 is external to the first equipment housing 355.

Figure 4:
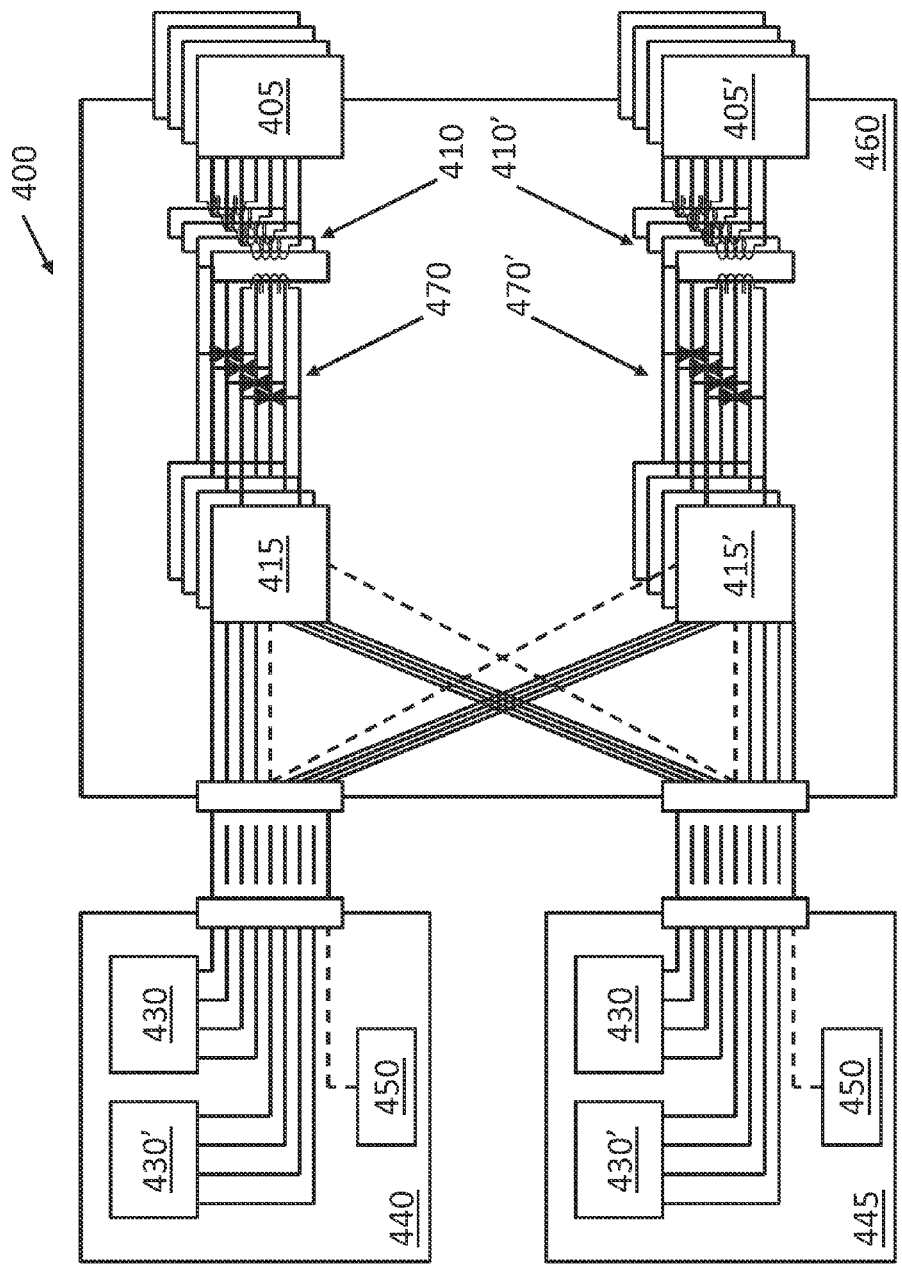
FIG. 4 is a schematic representation of telecommunications equipment in accordance with some embodiments.

FIG. 4 is a schematic representation of telecommunications equipment 400 in accordance with some embodiments. The telecommunications equipment 400 comprises some features that are the same as, or are similar to, corresponding features described above in relation to FIGS. 1, 2 and/or 3. The same reference numerals are used for such features but are incremented by 300, 200 and/or 100 respectively.

In FIG. 4, the flexible cables between the first and second mounting boards 440, 445 and the failover signal distributors 415 carry internal LIU-level signals and control signals (with the control signals being represented by broken lines in FIG. 4). Each element or component in the at least one further housing 460 has multiple instances; one per channel. In the telecommunications equipment 400 depicted in FIG. 4, there are eight channels and each element or component in the at least one further housing 460 therefore has eight instances. One set of external connectors 405 is for transmission of external signals and the other set of external connectors 405 is for reception of external signals.

The plurality of external connectors 405 comprises a plurality of receive external connectors, indicated using reference 405', and a plurality of transmit external connectors 405. The plurality of isolation transformers 410 comprises a plurality of receive isolation transformers, indicated using reference 410', and a plurality of transmit isolation transformers 410. The plurality of clamp diodes 470 comprises a plurality of receive clamp diodes, indicated using reference 470', and a plurality of transmit clamp diodes 470. The failover signal distributors 415 comprise a plurality of receive signal distributors, indicated using reference 415', and a plurality of transmit signal distributors, indicated using reference 415. Each of the receive and transmit signal distributors 415', 415 is arranged to be controlled by the at least one failover controller 450. The plurality of LIUs 430 comprises a plurality of receive LIUs, indicated using reference 430', and a plurality of transmit LIUs, indicated using the reference 430. The first and second mounting boards 440, 445 each include one or more receive LIUs 430' and one or more transmit LIUs 430.

Figure 5:
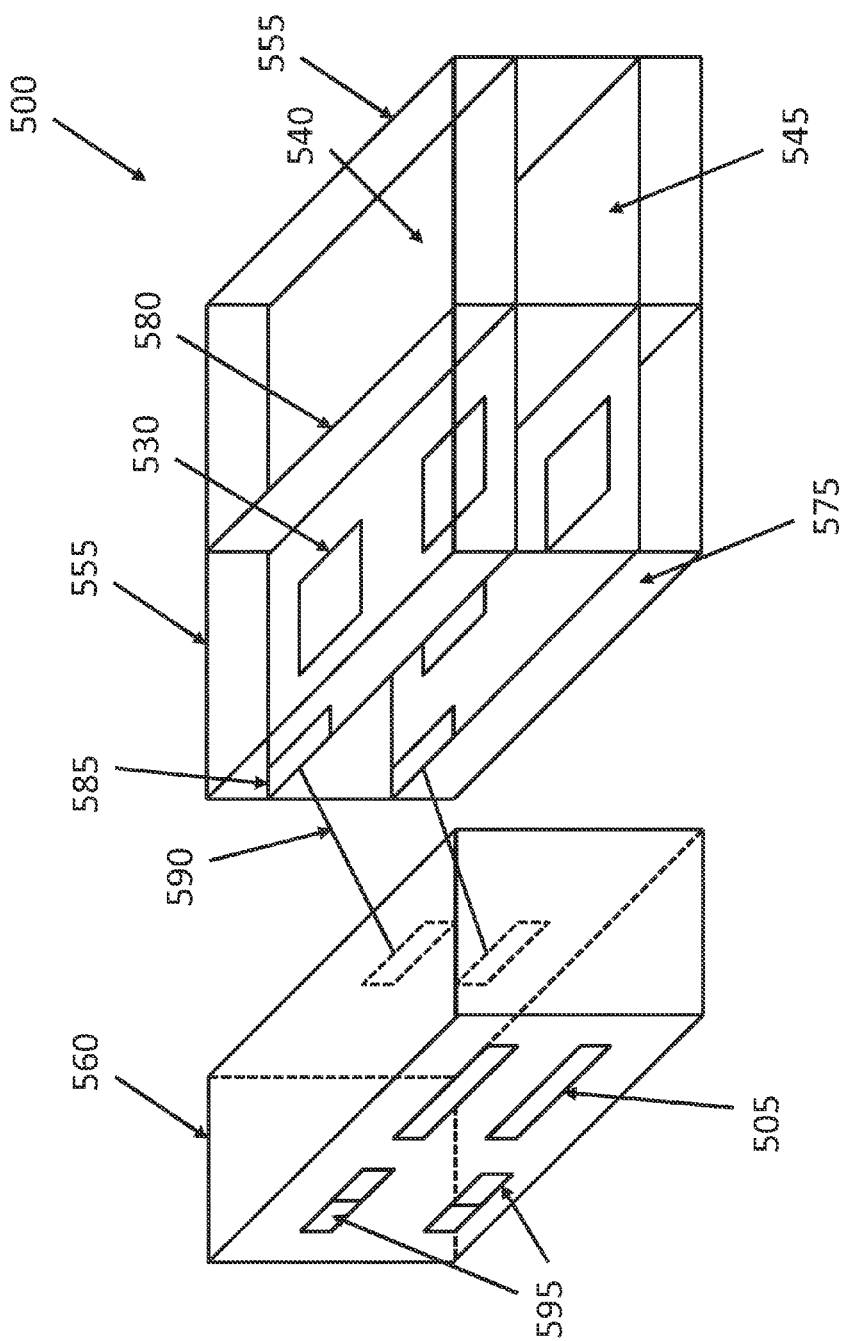
FIG. 5 is a schematic representation of telecommunications equipment in accordance with some embodiments.

FIG. 5 is a schematic representation of telecommunications equipment 500 in accordance with some embodiments. The telecommunications equipment 500 comprises some features that are the same as, or are similar to, corresponding features described above in relation to FIGS. 1, 2 and/or 3. The same reference numerals are used for such features but are incremented by 400, 300 and/or 200 respectively.

The first equipment housing 555 comprises first and second mounting boards 540, 545. The two mounting boards 540, 545 form an EPS pair of boards or blades. Each of the first and second mounting boards 540, 545 comprises a front board and a rear board (the latter sometimes being referred to as an RTM). The first and second mounting boards 540, 545 are interconnected by means of a backplane 575 and a midplane 580. Each of the first and second mounting boards 540, 545 comprises a high-density connector 585. In some embodiments, two flexible RTM-breakout cables 590 with high-density connectors at each end connect the first equipment housing 555 to corresponding high-density connectors 585 on the at least one further equipment housing 560. The at least one further equipment housing also includes status LEDs and push buttons 595 for tracing cables.

As described above, some embodiments provide telecommunications equipment comprising first and second signal processing modules each comprising one or more line interface units, a plurality of external connectors, and a plurality of isolation transformers arranged in one or more signal paths connected to the external connectors. The first and second signal processing modules are arranged to be activated dependent on a failover state of the first and second signal processing modules. A first equipment housing comprises at least the first and second signal processing modules and at least one further equipment housing comprises at least the external connectors and isolation transformers. Since isolation transformers are relatively physically large components, increased channel density can be achieved by locating the isolation transformers in a separate housing, without a need to increase the size of the first equipment housing.

In some embodiments, the at least one further equipment housing is external to the first equipment housing and connected via one or more flexible cables to the first equipment housing. This allows the further equipment housing to be flexibility located in a telecommunications equipment centre, e.g. a switching exchange, dependent on the space constraints within the equipment centre.

In some embodiments, the first housing is a chassis that is in accordance with one or more standard chassis specifications.

In some embodiments, the equipment comprises failover signal distributors operable to communicate signals to and/or from the first signal processing module and the second signal processing module.

In some embodiments, the isolation transformers are arranged in one or more signal paths between the external connectors and the failover signal distributors.

By providing the arrangement of external connectors, isolation transformers, and failover signal distributors in combination with the first and second signal processing modules, with the isolation transformers in one or more signal paths between the external connectors and the failover signal distributors, there is a saving in terms of isolation transformers compared with prior art solution in which two sets of isolation transformers are provided between the signal processing modules and the failover signal distributors. Since isolation transformers are relatively physically large components, the amount of space within the telecommunications equipment taken up by these components can be reduced and the channel density that can be achieved may therefore be increased. Further, since isolation transformers are far less likely to fail than the signal processing modules, a single set can be used whilst a high degree of failover protection is provided.

In some embodiments, the first housing comprises at least one failover controller for controlling the failover signal distributors.

In some embodiments, the failover signal distributors comprise a plurality of receive signal distributors and a plurality of transmit signal distributors, each of said receive and transmit signal distributors being arranged to be controlled by the at least one failover controller.

In some embodiments, the first and second signal processing modules are connected to each other via a midplane and the at least one further equipment housing comprises the failover signal distributors.

In addition to the above-described desire to increase densities, there is also a desire to achieve support for redundant processing of copper TDM signals without the need for dedicated midplane/backplane wiring. This is particularly relevant when trying to build telecommunications equipment using a standards-based chassis. Providing the failover signal distributors in the at least one further equipment housing allows the use of a midplane which need not be customised for the equipment to support Equipment Protection Switching (EPS).

In some embodiments, the midplane is in accordance with one or more standard midplane specifications.

In some embodiments, the at least one further equipment housing comprises a plurality of protection components, each corresponding to an external connector.

In some embodiments, the plurality of protection components comprises a plurality of clamp diodes.

In some embodiments, the first and second signal processing modules are connected to each other via a backplane.

In some embodiments, the backplane is in accordance with one or more standard backplane specifications.

In some embodiments, the first and second signal processing modules comprise rear transition module cards.

As described above, some embodiments provide a telecommunications equipment module comprising a plurality of external connectors and a plurality of isolation transformers, each corresponding to an external connector. The telecommunications equipment module is adapted to be connectable to first and second signal processing modules each comprising one or more line interface units. The first and second signal processing modules being are arranged to be activated dependent on a failover state of the first and second signal processing modules.

In some embodiments, the telecommunications equipment module comprises failover signal distributors operable to communicate signals to and/or from the first signal processing module and a second signal processing module, and the isolation transformers are arranged in one or more signal paths between the external connectors and the failover signal distributors.

As described above, some embodiments provide telecommunications equipment comprising a first equipment housing comprising at least one signal processing module and at least one further equipment housing that is communicatively couplable to the first equipment housing. The at least one further equipment housing comprises at least one external connector and at least one isolation transformer in one or more signal paths between the at least one external connector and the at least one signal processing module in the first equipment housing. The at least one further equipment housing is external to the first housing.

By providing the at least one isolation transformer in at least one further equipment housing that is external to the first equipment housing, the amount of space within the telecommunications equipment taken up by isolation transformers, which are physically relatively large, can be reduced and the channel density that can be achieved within the telecommunications equipment may therefore be increased.

The above embodiments are to be understood as illustrative examples of the invention. Further embodiments of the invention are envisaged.

For example, some embodiments describe the at least one further equipment housing being a single equipment housing, for example in the form of a breakout unit. In other embodiments, the at least one further equipment housing comprises a plurality of equipment housings, for example in the form of a plurality of breakout units. In some embodiments, the at least one further equipment housing may be in a different form to a breakout unit, for example it may form part of the main equipment housing.

Some embodiments describe a two-slot system with a midplane and mounting boards in an EPS pair. However, embodiments are envisaged for an n-slot system in which more than two mounting boards are provided. In some embodiments, the midplane need not be provided and the system may comprise a backplane and two or another number of front boards.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. Telecommunications equipment comprising:
   first and second signal processing modules each comprising one or more line interface units, the first and second signal processing modules being arranged to be activated dependent on a failover state of the first and second signal processing modules;
   a plurality of external connectors; and
   a plurality of isolation transformers arranged in one or more signal paths connected to the external connectors,
   wherein a first equipment housing comprises at least the first and second signal processing modules, and
   wherein at least one further equipment housing comprises at least the external connectors, the isolation transformers and a plurality of protection components, each of the plurality of protection components corresponding to an external connector.

2. Telecommunications equipment according to claim 1, wherein the at least one further equipment housing is external to the first equipment housing and is connected via one or more flexible cables to the first equipment housing.

3. Telecommunications equipment according to claim 1, wherein the equipment comprises failover signal distributors operable to communicate signals to and/or from the first signal processing module and the second signal processing module.

4. Telecommunications equipment according to claim 3, wherein the isolation transformers are arranged in one or more signal paths between the external connectors and the failover signal distributors.

5. Telecommunications equipment according to claim 3, wherein the first housing comprises at least one failover controller for controlling the failover signal distributors.

6. Telecommunications equipment according to claim 5, wherein the failover signal distributors comprise a plurality of receive signal distributors and a plurality of transmit signal distributors, each of said receive and transmit signal distributors being arranged to be controlled by the at least one failover controller.

7. Telecommunications equipment according to claim 3, wherein the first and second signal processing modules are connected to each other via a midplane and wherein the at least one further equipment housing comprises the failover signal distributors.

8. Telecommunications equipment according to claim 1, wherein the plurality of protection components comprises a plurality of clamp diodes.

9. Telecommunications equipment according to claim 1, wherein the first and second signal processing modules are connected to each other via a backplane.

10. Telecommunications equipment according to claim 1, wherein the first and second signal processing modules comprise rear transition module cards.

11. A telecommunications equipment module comprising:
    a plurality of external connectors; and
    a plurality of isolation transformers, each corresponding to an external connector,
    wherein the telecommunications equipment module is adapted to be connectable to first and second signal processing modules each comprising one or more line interface units, the first and second signal processing modules being arranged to be activated dependent on a failover state of the first and second signal processing modules, wherein the telecommunications equipment module comprises failover signal distributors operable to communicate signals to and/or from the first signal processing module and the second signal processing module, and wherein the isolation transformers are arranged in one or more signal paths between the external connectors and the failover signal distributors.

12. The telecommunications equipment module according to claim 11, wherein the failover signal distributors comprise a plurality of receive signal distributors and a plurality of transmit signal distributors, each of said receive and transmit signal distributors being arranged to be controlled by at least one failover controller.

13. The telecommunications equipment module according to claim 11, comprising a plurality of protection components, each of the plurality of protection components corresponding to an external connector.

14. The telecommunications equipment module according to claim 13, wherein the plurality of protection components comprises a plurality of clamp diodes.

15. Telecommunications equipment comprising:

a first equipment housing comprising at least one signal processing module; and at least one further equipment housing that is communicatively couplable to the first equipment housing, the at least one further equipment housing comprising:

at least one external connector; and at least one isolation transformer in one or more signal paths between the at least one external connector and the at least one signal processing module in the first equipment housing, wherein the at least one further equipment housing is external to the first equipment housing, and wherein the at least one further equipment housing comprises a plurality of protection components, each corresponding to an external connector.

* * * * *